United States Patent Office 3,043,117
Patented July 10, 1962

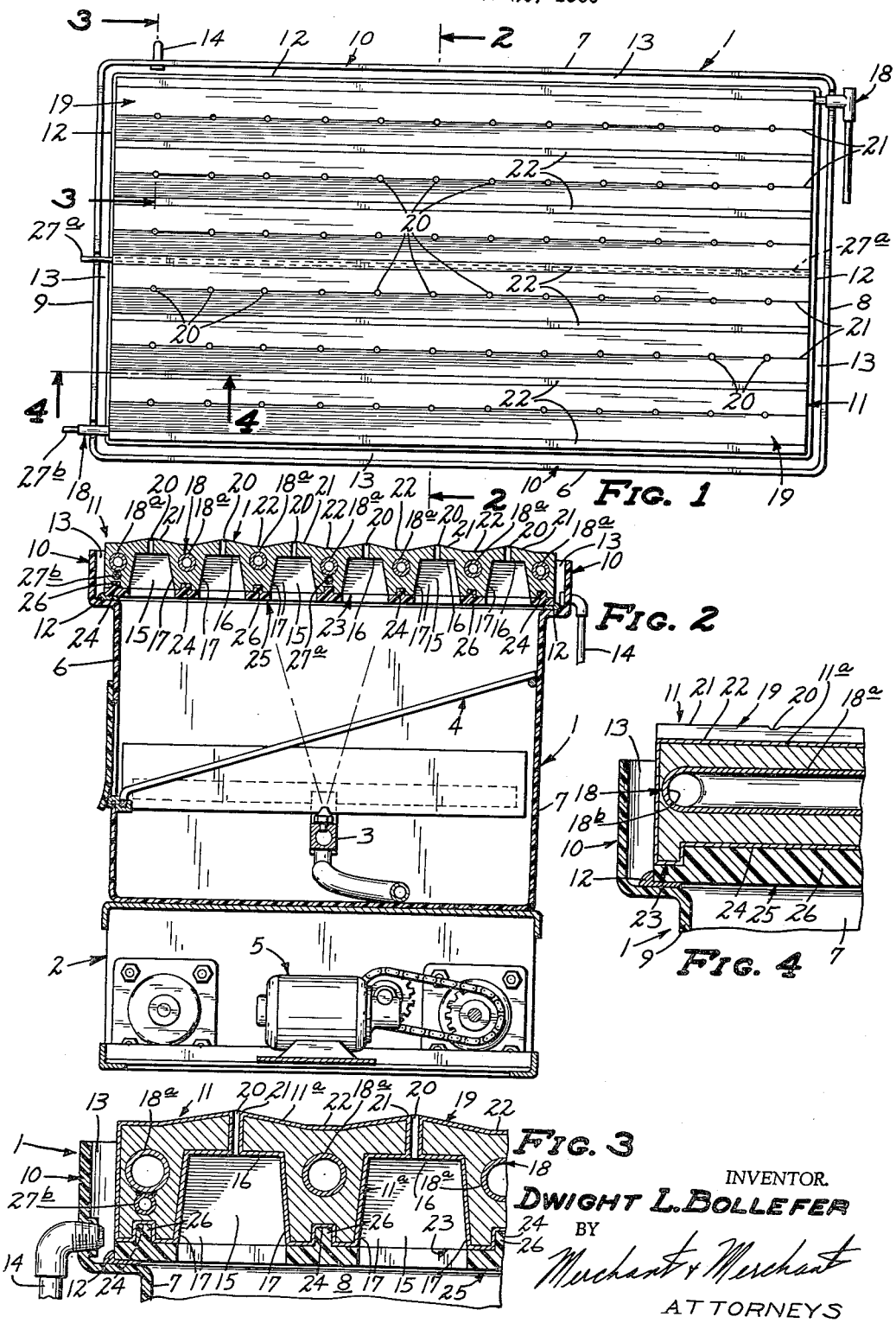

3,043,117
FREEZING MOLD FOR ICE CUBE MAKING MACHINES
Dwight L. Bollefer, Minneapolis, Minn., assignor to Kodiak, Inc., St. Paul, Minn., a corporation of Minnesota
Filed Oct. 28, 1960, Ser. No. 65,829
7 Claims. (Cl. 62—344)

My invention relates generally to ice cube making machines, and more particularly it relates to the improvement of a freezing mold for use with such machines of the type wherein water is sprayed into freezing cells to cause the cells to gradually become filled with ice in order to form the ice cubes.

It is well known among those skilled in the art to which my invention relates that the usual means for harvesting the ice cubes after they have been formed is to reverse the refrigeration cycle so that the temperature of the freezing mold is temporarily raised whereby to permit the release of the ice cubes. However, in order to permit the ice cubes to be freely released from the freezing mold, it has been necessary to provide each of the freezing cells of the freezing mold with an ejection aperture which opens in the top surface of the freezing mold so as to permit the application of an ejection force to the ice cube whereby to break any vacuum which might otherwise deter the formed cubes of ice from dropping out of the freezing cells. However, the use of such ejection apertures has presented a particular problem in the industry since their presence permits the upward passage of portions of the freezing liquid during the initial freezing process. Since the top surface of the freezing mold usually presents a place for the collection of dust and other foreign matter, it has become necessary for health and other reasons to prevent the contaminating re-entry of any of such liquid back into the freezing cells.

In light of the above introductory remarks regarding the problem of which my invention is a solution, an important object of my invention is the provision of a freezing mold for ice cube making machines which is formed so as to prevent the contaminating re-entry into the freezing mold of any liquid which might pass upwardly through the ejection apertures of the freezing mold.

Another object of my invention is the provision of a freezing mold for ice cube making machines which obviates any objection on the basis of uncleanliness of the above described type of ice cube making machines.

Another object of my invention is the provision of the freezing mold for use with ice cube making machines which is constructed so as to provide for the drainage and removal of any liquid that might present problems of contamination of the freezing liquid used in the machine.

A further object of this invention is the provision of skirt means in combination with the freezing mold of my invention for preventing the bridging of ice between the freezing cells of the freezing molds.

Another object of this invention is the provision of a capillary control tube in combination with my freezing mold for regulating the refrigerating cycle of the refrigeration apparatus of the ice cube making machine.

Other objects of this invention reside in the provision of a freezing mold for an ice cube making machine which sustains all of the above objects with a great amount of efficiency, and yet may be economically produced, and is simple in construction.

The foregoing and other objects and advantages of his invention will become apparent from the following detailed specification, appended claims and attached drawings.

Referring to the drawings, wherein like reference characters indicate like parts of elements throughout the several views;

FIG. 1 is a view in top plan of my invention, some parts being broken away;

FIG. 2 is a view in vertical section taken on the line 2—2 of FIG. 1;

FIG. 3 is an enlarged view in vertical section taken on the line 3—3 of FIG. 1, some parts being broken away; and FIG. 4 is an enlarged view in vertical section taken on the line 4—4 of FIG. 1, some parts being broken away.

Referring with greater particularity to the drawings, an ice cube making machine is shown, the latter comprising an upper cabinet represented generally by the reference numeral 1, and a lower cabinet, represented generally by the reference numeral 2. Spray means for forcing the freezing liquid in an upwardly directed spray is represented generally by the reference numeral 3, and a harvesting rack is represented by the reference numeral 4. Motor means and mechanism is shown at 5 in the lower cabinet 2 for imparting reciprocating movements to the spray means 3. Of course, refrigeration apparatus must be used in combination with my invention, but since the same in itself does not comprise the instant invention, and also since the same may be of any well known and readily available type, the showing and further description thereof will be omitted for the sake of brevity. The upper cabinet 1 comprises front and rear walls 6 and 7 respectively, and side walls 8 and 9.

Adjacent its upper end, the upper cabinet 1 defines a laterally projecting peripheral flange 10 which supports a freezing mold, represented generally by the reference numeral 11, the freezing mold 11 being sealed to the cabinet 1 by means of a sealant 12. It is noted that the freezing mold 11 is disposed within the upper cabinet 1 in spaced relationship to the flange 10 so as to define a marginal drainage collection receptacle 13, which is drained by means of the drain pipe 14. The freezing mold 11 comprises a plurality of rows of inverted freezing cells or cups 15, as shown in FIGS. 2 and 3, the freezing cells 15 also preferably being alignable in substantially straight parallel transverse rows. Each of the freezing cells 15 is preferably cross-sectionally rectangular and has a substantially closed top wall 16 and downwardly diverging side walls 17, the bottom of the freezing cell 15 being open. The freezing mold 11 is preferably manufactured from heat conducting metal, and is also preferably formed, as by molding, to provide a unitary construction. Also, as shown in FIGS. 3 and 4, the freezing mold 11 is provided with an anodized coating 11a which is of aid in the production of clear ice cubes. Referring to FIGS. 2–4, a tubular evaporator coil, represented generally by the reference numeral 18, is molded within the freezing mold 11 and comprises spaced generally parallel portions 18a and U-bend connecting portions 18b, the parallel portions 18a being disposed in the intermediate wall structure between adjacent rows of freezing cells 15. The evaporator coil 18 is connected to the above mentioned refrigeration apparatus so as to provide means for refrigerating the wall surfaces of the freezing cells whereby to cool the liquid sprayed therein.

The freezing mold 11 defines a generally horizontally disposed top surface 19, and also defines a plurality of ejection apertures 20 one each defined generally centrally within the top wall 16 of each of the freezing cells 15. The ejection apertures 20 open in the top surface 19 of the freezing mold 11. It is noted that the downward diversion of the side wall 17 of the freezing cells 15 permits the ice cubes formed in the cells 15 to be readily harvested, and the ejection apertures 20 permit the application of an ejection force to the ice cubes whereby to break any vacuum which might otherwise deter the formed cubes of ice from dropping out of the freezing cells during the harvesting of the ice cubes. It is noted that such an ejection force might be applied by the introduction of atmosphere to the upper ends of the freezing cells or it might also be applied by the use of a plurality of push rods, not shown.

As noted in the introduction to this application, the use of the ejection apertures 20 necessitates a further improvement in the freezing mold 11 in order to prevent any liquid that might pass upwardly through the ejection apertures 20 from re-entering the freezing cells 15 and thereby contaminating the same with dust and other foreign particles which in all probability might collect on the top surface 19 of the freezing mold 11. Therefore, in accordance with my invention, the top surface 19 of the freezing mold 11 is formed to define a plurality of generally parallel ridges 21 which extend between the ejection apertures 20 in general alignment with each row of the freezing cells 15. Also, the top surface 19 of the freezing mold 11 defines a plurality of generally parallel recesses 22 which are one each disposed generally intermediate the ridges 21 in general parallelism therewith, whereby to remove any accumulated liquid from the area of the top surface 19 adjacent the ejection apertures 20 and drain the same to the marginal collection receptacle 13. The bottoms of the recesses 22 slope downwardly a slight amount in both longitudinal directions from the longitudinal center thereof so as to better permit said drainage to the receptacle 13.

Referring to FIGURES 2-4, the grid face 23, defined by the bottom of the freezing mold 11 intermediate the freezing cells 15 is provided with generally centrally spaced grooves 24 which intersect to form a groove pattern. In accordance with my invention, an insulating skirt 25 is disposed at the bottom of the freezing mold 11 around the open bottom of each of the freezing cells 15. The insulating skirt 25 is secured to the freezing mold 11 by means of the upstanding projections 26 which are formed to fit into the corresponding grooves 24 of the freezing mold 11. Obviously, the skirt 25 may be secured to the grid face 23 of the freezing mold by means of a bonding agent, not shown. The skirt 25 is of particular importance to my invention, since the same prevents the bridging of ice between the freezing cells 15, which bridging, of course, would prevent satisfactory harvesting of the ice cubes.

FIGURES 2 and 3 disclose another important feature of my invention, which is the provision of capillary control tubes 27a and 27b which are secured in side-by-side longitudial alignment with a selected pair of the spaced portions 18a of the evaporator coil 18 so as to regulate the refrigerating cycle of the above noted refrigeration apparatus. Such a disposition of the capillary control tubes 27a and 27b in side-by-side longitudinal alignment with the spaced portions 18a of the evaporator coil 18 provides a heretofore unknown degree of accuracy of control since exhaustive tests thereof have indicated that there is very little, if any variation in temperature response throughout repeated cycles of the machine. It might be specifically noted that in the illustrated embodiment the control tube 27a controls the cut-off of the freezing cycle and the start of the defrosting or heating cycle, and is therefore disposed generally centrally in the freezing mold 11 so as to be responsive to the mean temperature of the evaporator coil 18 and the mold 11; whereas the control tube 27b controls the cut-off of the heating cycle and the start of the freezing cycle, and is therefore disposed near the outlet end of the evaporator coil 18 so as to insure that the freezing mold 11 has released all of the ice cubes before the next cycle is started.

Having specifically described my invention, the operative simplicity thereof is thought to be hereinbefore explicitly set forth, and further comment with respect thereto would only be a matter of duplication.

This invention has been thoroughly tested and is found to be completely satisfactory for the accomplishment of the above objects; and while I have shown and described above a preferred embodiment thereof, in which the principles of the present invention have been incorporated, I wish it to be specifically understood that the same may be modified without departure from the scope and spirit of the appended claims.

What I claim is:

1. In an ice cube making machine of the type having refrigeration apparatus, spray means for forcing a liquid in an upwardly directed spray, and harvesting means for collecting said ice cubes, the improvement of a metallic freezing mold for forming said cubes and disposed in overlying spaced relation to said spray means and having a generally horizontally disposed top surface, said improvement comprising a plurality of substantially straight parallel rows of inverted freezing cells having substantially closed tops and open bottoms, evaporator coil means connected with said refrigeration apparatus and disposed adjacent said rows of cells for refrigerating the wall surfaces of said cells so as to cool liquid sprayed therein, said mold defining a plurality of ejection apertures one each disposed within the top of each of said freezing cells and opening in said top surface of said mold, and the top surface of said mold being formed to define relatively high portions contiguous with each of said ejection apertures and relatively low portions in the intermediately spaced area between said apertures whereby to provide for the drainage and removal of any of said liquid that might pass upwardly through said apertures so as to prevent the contaminating re-entry of the same within said freezing cells.

2. A metallic freezing mold for use with an ice cube making machine, said freezing mold comprising a plurality of substantially straight parallel rows of inverted freezing cells having substantially closed tops and open bottoms, said freezing mold having a generally horizontally disposed top surface, said mold also defining a plurality of ejection apertures one each disposed within the top of each of said freezing cells and opening in said top surface of said mold, and the top surface of said mold being formed to define relatively high portions contiguous with each of said ejection apertures and relatively low portions in the intermediately spaced area between said apertures.

3. The structure defined in claim 1 in which said relatively high portions comprise generally parallel ridges extending between said ejection apertures one each in general alignment with each row of said freezing cells, and in which said relatively low portions comprise generally parallel recesses disposed generally intermediate said ridges in general parallelism therewith.

4. The structure defined in claim 2 in which said freezing mold is coated with a relatively thin anodized coating.

5. The structure defined in claim 1 in which said evaporator coil means comprises a tubular coil molded within said metallic mold and having spaced portions disposed in the wall structure of said metallic mold intermediate said adjacent rows of freezing cells.

6. The structure defined in claim 2 in which said relatively high portions comprise generally parallel ridges extending between said ejection apertures one each in general alignment with each row of said freezing cells, and in which said relatively low portions comprise generally parallel recesses disposed generally intermediate said ridges in general parallelism therewith.

7. In an ice cube making machine of the type having refrigeration apparatus, spray means for forcing a liquid in an upwardly directed spray, and harvesting means for collecting said ice cubes, the improvement of a metallic freezing mold for forming said cubes and disposed in overlying spaced relation to said spray means and having a generally horizontally disposed top surface, said improvement comprising a plurality of substantially straight parallel rows of inverted freezing cells having substantially closed tops and open bottoms, evaporator coil means connected with said refrigeration apparatus and disposed adjacent said rows of cells for refrigerating the wall surfaces of said cells so as to cool liquid sprayed therein, said mold defining a plurality of ejection apertures, one each disposed within the top of each of said freezing cells and opening in said top surface of said mold, and the top surface of said mold being formed to define relatively high portions at each of said ejection apertures and relatively low portions in the intermediately spaced area between said apertures whereby to provide for the drainage and removal of any of said liquid that might pass upwardly through said apertures so as to prevent the contaminating re-entry of the same within said freezing cells.

References Cited in the file of this patent

UNITED STATES PATENTS

| | | |
|---|---|---|
| 2,279,253 | Slunder | Apr. 7, 1942 |
| 2,617,269 | Smith-Johannson | Nov. 11, 1952 |
| 2,656,686 | Bayston | Oct. 27, 1953 |
| 2,674,858 | Magnuson | Apr. 13, 1954 |
| 2,677,249 | Mason | May 4, 1954 |
| 2,722,110 | Denzer | Nov. 1, 1955 |
| 2,729,070 | Ames | Jan. 3, 1956 |
| 2,763,993 | Bayston | Sept. 25, 1956 |
| 2,774,224 | Bayston | Dec. 18, 1956 |
| 2,892,323 | Woodmark | June 30, 1959 |
| 2,949,019 | Roberts | Apr. 16, 1960 |